United States Patent [19]

Decker

[11] 4,122,356

[45] Oct. 24, 1978

[54] SOLAR HEAT PIPE FEEDBACK TURBOGENERATOR

[76] Inventor: Bert J. Decker, 136 Copen Blvd., Buffalo, N.Y. 14226

[21] Appl. No.: 704,970

[22] Filed: Jul. 13, 1976

[51] Int. Cl.² .............................. F03G 7/02; F24J 3/02
[52] U.S. Cl. ........................................ 290/52; 60/641; 126/271; 165/105; 290/1 R
[58] Field of Search .................. 126/270, 271; 60/641, 60/398; 290/1, 2, 52; 165/45, 105

[56] References Cited

U.S. PATENT DOCUMENTS

| 3,152,442 | 10/1964 | Rowekamp | 126/271 |
|---|---|---|---|
| 3,159,554 | 12/1964 | Mount | 126/271 |
| 3,514,942 | 6/1970 | Kyryluk | 60/641 |
| 3,563,305 | 2/1971 | Ham | 126/270 |
| 3,875,926 | 4/1975 | Frank | 126/271 |
| 3,919,998 | 11/1975 | Parker | 126/271 |
| 3,949,732 | 4/1976 | Reines | 126/270 |

FOREIGN PATENT DOCUMENTS

| 814,146 | 11/1936 | France | 60/641 |
|---|---|---|---|
| 920,510 | 1/1947 | France | 60/641 |
| 2,231,247 | 12/1974 | France | 60/641 |
| 481,611 | 2/1951 | Italy | 60/641 |
| 23,624 | 10/1911 | United Kingdom | 60/641 |
| 353,279 | 7/1931 | United Kingdom | 60/641 |

*Primary Examiner*—Robert K. Schaefer
*Assistant Examiner*—John W. Redman
*Attorney, Agent, or Firm*—Raymond F. Kramer

[57] ABSTRACT

Radiant heat is converted to electricity by a heat pipe - turbogenerator combination. Specifically, a heat pipe having heat-sorbing wicking or other material in an evaporation section thereof from which the heat pipe liquid in contact with or adjacent said wicking may evaporate, has such wicking heated by radiant heat, as by solar heat, vaporizing the liquid to a gas, which passes through a turbogenerator to a condensation section wherein it is condensed to the liquid, which is returned to the evaporation section. The heat pipe - turbogenerator assembly is suitably externally insulated, as by a vacuum shield, to prevent heat losses and heat is recovered from the condenser portion of the heat pipe and returned to the evaporator portion.

In an application of the generic invention it is employed in a building, such as a house, where it is utilized on wall and roof portions thereof and serves as at least a partial supporting structure for these. In another application the solar heat pipe feedback turbogenerator may be incorporated in or used with reflective means, such as reflective sheet material of large area positioned to direct solar radiation onto the evaporator section of the heat pipe, which reflective means may be supported by gas balloons or other useful supports and may be changed in position to "follow the sun" to produce maximum power during operation.

29 Claims, 6 Drawing Figures

SOLAR HEAT PIPE FEEDBACK TURBOGENERATOR

This invention relates to an apparatus for producing electricity from radiant heat. More particularly, it relates to a heat pipe having an evaporating section and a condensing section with a turbogenerator between them and with the evaporating section adapted to receive radiant heat to vaporize a vaporizable liquid therein so that the flow of the gas produced through the turbogenerator and to the condensing section drives the turbogenerator to generate electricity.

Heat pipes have been reported to have very great heat transferring capabilities in articles such as that entitled "The Heat Pipe" by G. Y. Eastman, in *Scientific American*, May 1968, p. 38. It appears that transfer rates as high as 320,000 Btu./hr./sq. ft. of evaporator surface can be obtained when water at 100° C. is employed. Such a heat transfer rate corresponds to about 125 horsepower or 94 kilowatts developed per square foot of evaporator area. Thus, even with small evaporator areas considerable power can be generated providing that a satisfactory heat source is employed.

Because of energy shortages in recent years and especially because of shortages of fossil fuels such as oil and gas, various efforts have been made to find other sources of energy and to develop apparatuses for utilizing them. Thus, geothermal energy, wind power, tidal power, temperature differential power and solar power have been explored, in addition to nuclear power. A notable use of solar power is in solar cells employed to charge batteries of space vehicles but they have also been used to charge telephone line relays or boosters on earth, and some have been set in roofs of houses to supply domestic electricity. However, such cells require expensive radiation receivers and involve great capital investments, especially compared to the apparatuses of the present invention.

The present invention provides a comparatively inexpensive, low capital investment apparatus for converting radiant heat, such as solar energy, to electricity. Such apparatus may be employed in various applications, sometimes serving as a structural part of a building or as an independent unit, which may be employed with suitable sorbent materials to take up the radiation energy and/or with reflectors or lenses which may concentrate such energy and direct it onto the evaporating portion of the heat pipe.

In my earlier application, Ser. No. 693,195, of which this application is a continuation-in-part, there is described a heat pipe-turbine, in which the turbine is located between evaporating and condensing sections of a heat pipe and is driven by gas produced in the evaporating section and passing to the condensing section. In that application the employment of a turbogenerator to generate electricity is described, as is the conservation of energy imparted to the cooling fluid employed by condensation of the gas from the vaporizable heat pipe liquid. In such parent application it is mentioned that instead of burning fuel to produce the heat needed to vaporize the vaporizable liquid in the evaporating section one might also employ solar heat or various other heat sources but no specific description of suitable apparatuses are given. Such apparatuses are described in the present specification and are even more efficient and economical than the preferred apparatuses of Ser. No. 693,195.

In accordance with the present invention a heat pipe electric generator for converting radiant heat to electric power comprises a heat pipe having a vaporizable liquid therein and including evaporating and condensing sections, between which sections gas from the vaporizable liquid passes, from the evaporating section to the condensing section, and such liquid passes from the condensing section to the evaporating section, with means for converting the energy of the moving gas to electricity, said evaporating section having with it means for sorbing radiant heat directed onto said means and said condensing section having with it means for cooling gas therein to condense it. Thus, a solar heat pipe electric generator for converting radiant solar heat to electric power comprises a heat pipe having a vaporizable liquid therein, and including a walled evaporating section and a condensing section, with a wall of the evaporating section being transmissive of radiant solar energy and being positioned so that such solar energy is directed onto it, a wicking material adjacent such wall and within the heat pipe for sorbing solar heat, with connecting means between the evaporating and condensing sections, through one of which the vaporizable liquid, on heating by the solar heat, passes as a gas from the evaporating section to the condensing section and through another of which condensed liquid from said gas passes from the condensing section to the evaporating section, with means in such first connecting section for converting the energy of the moving gas to electricity, said condensing section having with it means for cooling said gas therein to condense it. In preferred embodiments of the invention the means for converting energy of a moving gas to electricity is a turbogenerator, dark colored material, preferably fibrous material, such as black wicking, is employed to sorb the radiant heat passing into the evaporating section of the heat pipe through a transparent wall and a means for cooling the gas from the vaporizable liquid to condense it is a cooling fluid which is thereby heated and from which such heat is extracted to supplementarily heat the vaporizable liquid in the evaporating section of the heat pipe. In variations of the invention the apparatuses thereof are employed as structural panels in buildings and are used with various reflecting means for increasing radiation onto the evaporating section of the heat pipe. Also within the invention is a method for generating electricity from radiant energy by means of a heat pipe with turbogenerator therein.

The invention will be readily understood from the description thereof in this specification, taken together with the drawing, in which the same numerals in the various figures designate similar parts and in which.

Figure 6:
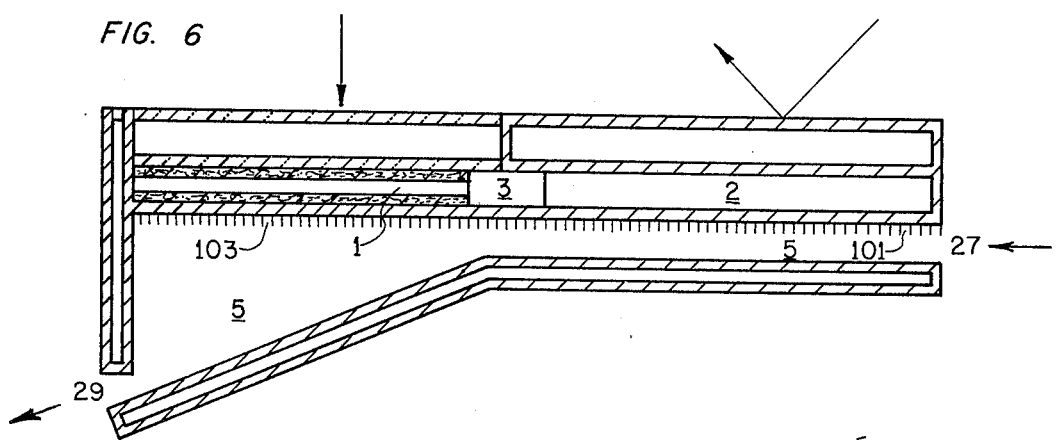
Figure 4:
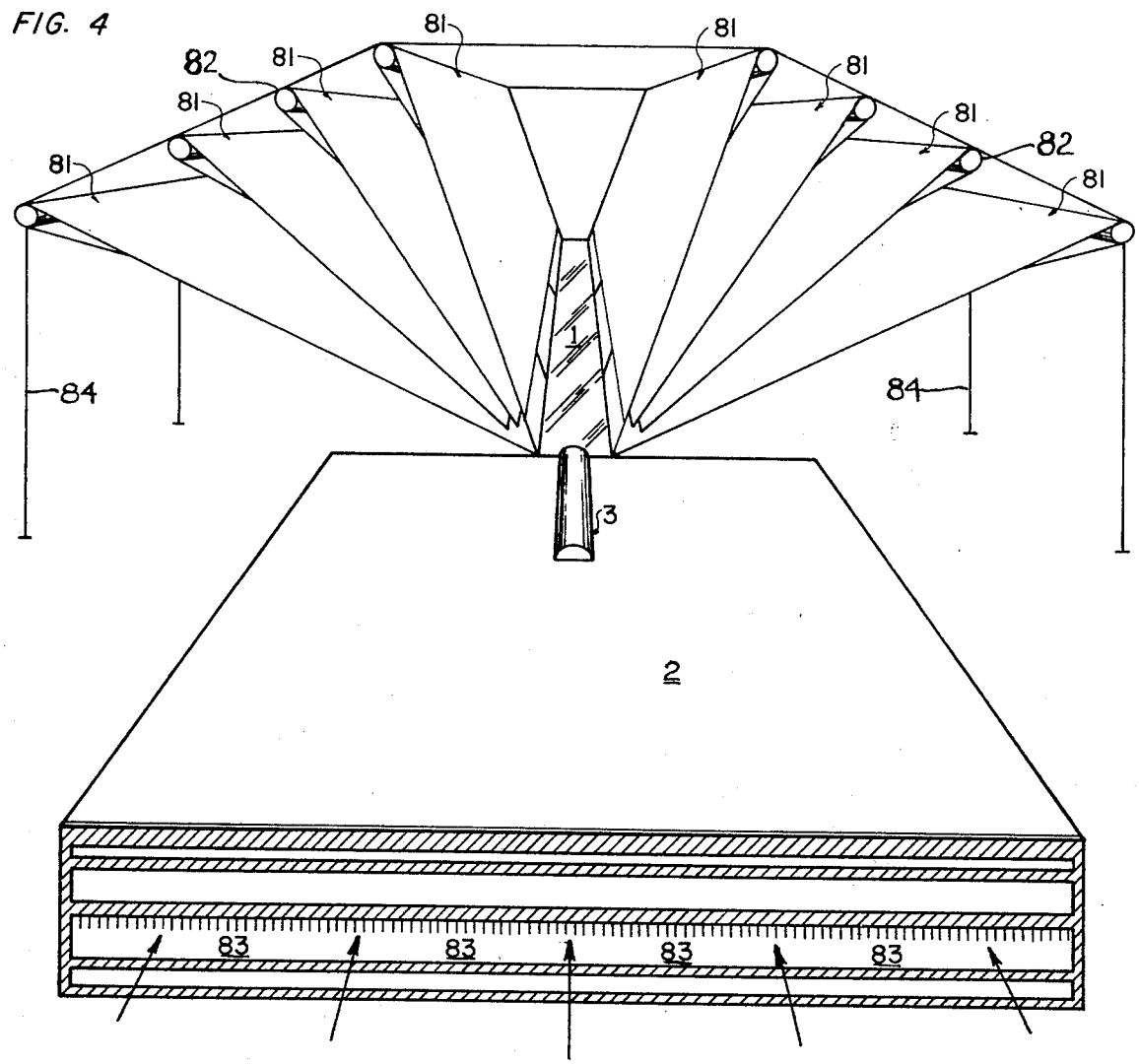
FIG. 4 is a partially sectioned perspective view of a solar heat pipe panel feedback turbogenerator of this invention in a horizontal plane with a plurality of reflective sheets reflecting the sun's rays onto the evaporating section of the heat pipe thereof.
Figure 5:
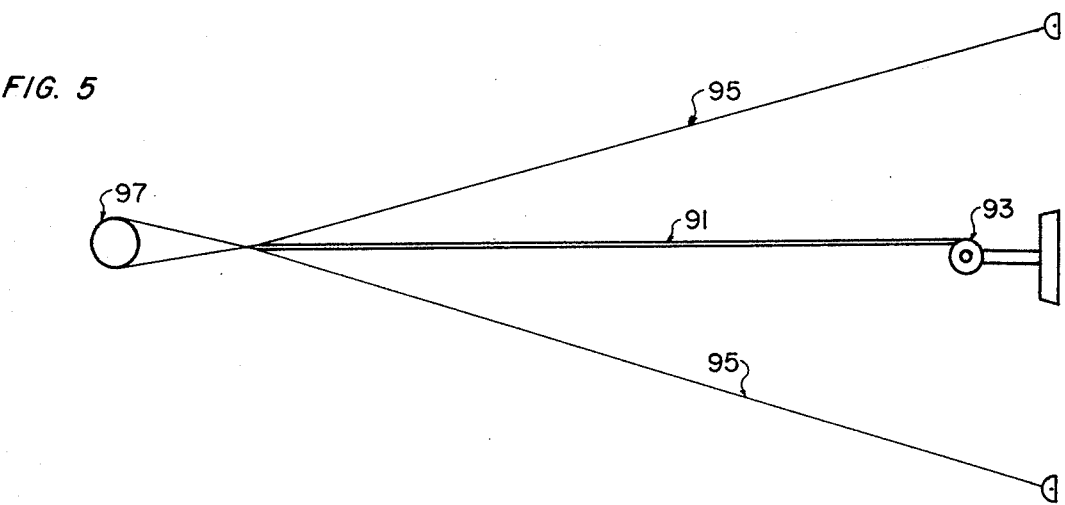

FIG. 5, which should be viewed from the right side of the sheet, is a vertical elevation of supplementary reflecting means for use with the apparatus of FIG. 4 to additionally reflect solar radiation onto the evaporating section of the heat pipe thereof; and FIG. 6 is a partially sectioned vertical elevational view of the heat pipe of FIG. 4.

Figures 1, 2:
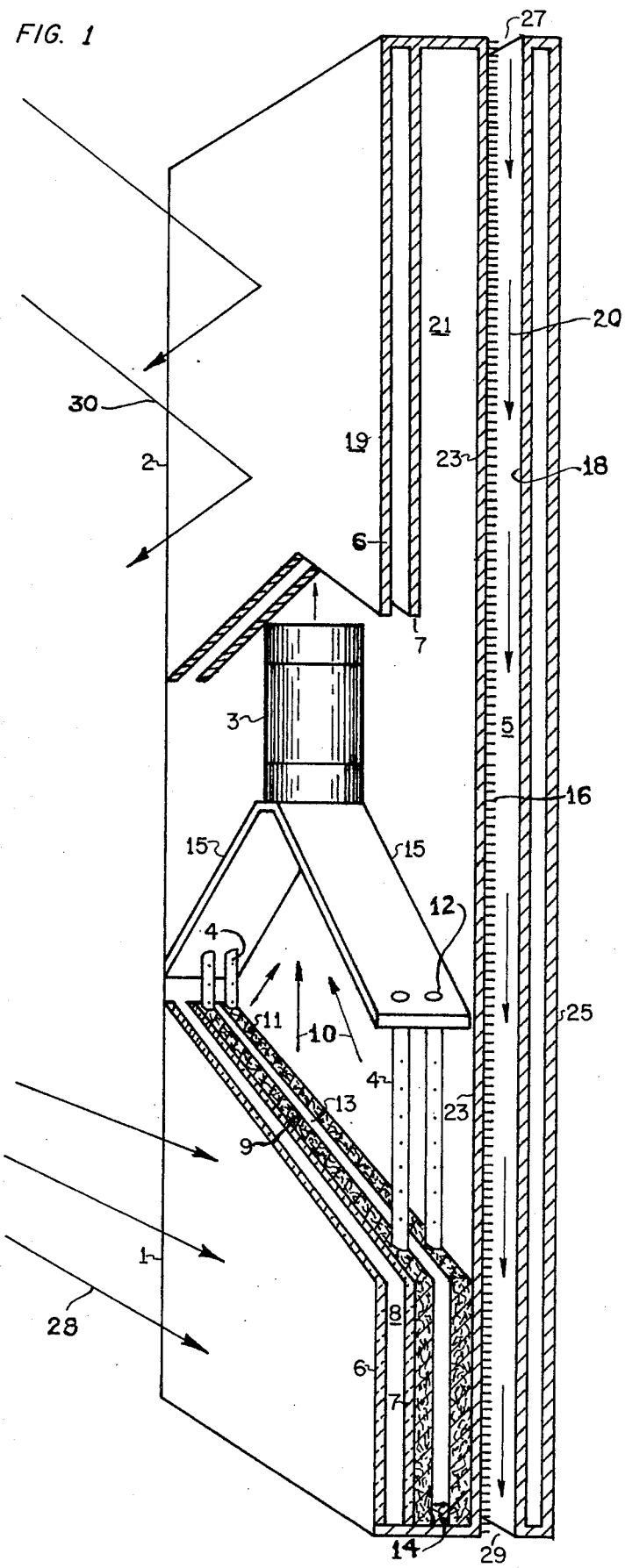
FIG. 1 is a partially cutaway sectional perspective view, in elevation, of a solar heat pipe panel feedback turbogenerator.
FIG. 2 is a partially centrally sectioned elevational view of a fan apparatus for delivering cooling air or other cooling fluid to a heat feedback passage of the apparatus of FIG. 1.

In FIG. 1 the illustrated apparatus includes a heat pipe evaporator section 1, a heat pipe condenser section 2 and a turbogenerator 3 between such sections for generating electricity when gas which is from vaporizable liquid in the evaporating section 1 passes through the turbine thereof and drives the electric generator. Because turbogenerator combinations are well known the parts thereof will not be indicated separately and the means for generating electricity will be referred to hereinafter as a unit although it is understood that it comprises both a turbine, driven by the gas passing through it, and a generator, either directly or indirectly driven by the turbine to generate electricity, which may be withdrawn from the generator by appropriate wiring. As illustrated the apparatus is positioned vertically but it can be set at an angle, with the condensing section up or, if provided with means other than gravity for returning condensate to the evaporating section, it can be positioned horizontally or with the evaporating section above the condensing section.

Baffle or director 15 within the heat pipe serves to separate the evaporating and condensing sections thereof and to direct gas passing from the evaporating section to the condensing section, the flow of which is represented by arrows 10, through the turbogenerator or equivalent means employed for generating electricity. Baffle 15 also serves to direct condensate liquid flowing downwardly along the walls of the condensing section or chamber to the bottoms of side portions of said section, from whence the liquid passes through openings 12 and perforated tubes or pipes 4 into the evaporating section. The heat pipe walls 7 and 23 have located next to them in the evaporating section throughout its height, up to baffle 15, suitable material(s) 9 and 11, preferably fibrous, porous, openwork on wicking material(s), which permits movement of liquid and generated gas through it. The perforated pipes or tubes 4 penetrate such material to facilitate distribution of returned condensate (vaporizable liquid) throughout the effective major surface areas of the heat pipe evaporating section, especially those adjacent the heat pipe wall onto which radiant heat is directed. Additional suitable such material 14 is located at the bottom of the heat pipe evaporating chamber but the space or raceway 13 between the major pads or slabs of wicking material is normally kept free throughout the height of the evaporating section, especially as it approaches the baffle 15 and turbogenerator 3, so as to facilitate gas movement to and through the generator. In the illustration given wicking portions 9, 11 and 14 are all black or at the very least are dark colored to promote good heat sorption by them and it is especially important that wicking material 9 be of such dark color and most preferably be perfectly black since it absorbs the major radiant heat input to the heat pipe, normally radiant solar heat.

Condensing section 2 of the heat pipe portion of the present apparatus includes a walled condensing chamber 21, the walls 23 and 7 of which are common with those of the evaporating chamber. While said walls may include coverings, surface irregularities, baffles or internal bracing members, normally they will be smooth, as illustrated, on sides facing the heat pipe interiors, so that the condensate forms directly on them or at least on one of them when such wall is cooled, as by passage of a cooling fluid into contact with the wall exterior. Throughout the height of wall 23, in the illustrated preferred embodiment it is covered with a multiplicity of protrusions or pins 16, or equivalent structures, preferably of heat conductive material, such as copper or aluminum. These roughen such exterior surface to cause greater turbulence of the fluid passed into contact with it and to increase conductivity and heat transfer areas, thereby promoting heat transfer through wall 23. Thus, cooling fluid passing through passageway 5, defined by the exterior of wall 23 and interior of wall 18 of vacuum insulated casing 25, will better condense gas in the condensing section of the heat pipe. Additionally, in the evaporating section the heated fluid, usually air, passing downwardly through passageway 5, will impart its heat to wicking material 11 and the vaporizable liquid therein to aid in vaporization thereof. In the drawing the direction of flow is indicated by arrows 20 and the cooling fluid, ambient air, is shown entering passagway 5 through entrance opening 27 and being exhausted from it through exit 29. Such flow is preferably effected by utilization of a fan, blower, pump or other suitable mechanism, such as the fan 31 driven by motor 33, as illustrated in FIG. 2. Fan shroud 22 is connected to tapering wall 24 and conduit 26, which is suitably joined to the top of the heat pipe apparatus of FIG. 1 so that the air directed by the fan moves downwardly through passageway 5.

To conserve energy vacuum insulated casing 25 bounds the side of the heat pipe apparatus away from the source of radiation direction onto it. Thus, changes in temperature of the cooling fluid due to external effects by conduction and convection are reduced and by utilizing reflective walls or an opaque wall on the casing exterior (preferably on both sides) radiation effects will also be minimized. Thus, the heat of condensation extracted from the condensing section of the heat pipe by the cooling fluid is available for transfer to the vaporizable liquid in wick 11. In a variation of the invention baffle 15 may be inclined and the openings 12 and perforated tubes 4 communicating with wicking material 9 may be closed off so that all condensate will flow through wicking material 11 to take up heat from the cooling-heating fluid transversing passageway 5, after which the warmed liquid will be wicked upwardly through material 9 to be further heated and vaporized by radiant heat, such as solar heat.

As illustrated in FIG. 1 the major side of the heat pipe apparatus facing the source of radiation (and in some applications of this invention the apparatus may be moved to be facing such source, e.g., the sun, as it moves), is vacuum insulated too, a vacuum insulated casing being formed between glass or synthetic organic polymeric plastic or other suitable sheets 6 and 7. Such sheets are transparent where they bound the evaporating section but at least one of them and very preferably the outer one 6, is opaque or reflective to radiated heat, as illustrated, with reflective surfaces 19 thereon to prevent radiant energy from adding heat to the condensing chamber, which would thwart the objective thereof, to condense heat pipe gas therein. Arrows 28 indicate the direction of radiation and its passage through walls 6 and 7 of the evaporating section of the heat pipe to wicking 9 where the heat vaporizes the heat pipe liquid. Arrows 30 show the impingement of radiation onto surfaces 19 of wall 6 of the condensing section of the heat pipe and its reflection therefrom. In a variation of this invention the use of the vacuum or other type of insulated chamber on the radiant impinging side of the condensing chamber of the heat pipe may be omitted and a reflective, opaque or other suitable coating may be applied to the condensing section part of wall 7 to prevent heating up of the condensing chamber.

In operation the apparatus of FIGS. 1 and 2, containing a suitable vaporizable liquid, preferably water (but other heat pipe liquids are also utilized, such as ethanol, acetone and fluorinated lower hydrocarbons, e.g., trichloromonofluoromethane, dichlorodifluoromethane, hexafluoroethane), with a desired pressure of non-condensible gas (such as air) above it, is positioned with a transparent radiant heat-transmissive side of the evaporating section and a reflective or opaque side of the condensing section facing the sun or other source of radiant heat. The heat impinging on the wicking material vaporizes the liquid on it and drives the gas produced through the turbogenerator to the condensing section, wherein it condenses and falls back again by gravity to the wicking materials in the evaporating section, with the condensate adjacent the heat recuperating wall of the evaporating zone (away from the source of radiant heat) being heated by the cooling-heating gas and extracting some of the heat therein obtained from the heat of condensation in the condenser of the condensible gas therein. Thus, in addition to the normal efficiency of operation of the heat pipe and the generation of electricity as an integral function thereof, there is obtained a saving of at least some of the heat of condensation, too. Various pressures of the non-condensible gas in the heat pipe can be employed and by means of changes in such pressures the operating characteristics of the heat pipe can be altered. Thus, if the ambient air is cold, by lowering the pressure of non-condensible gas in the heat pipe a greater flow of gas through the turbogenerator is obtainable because the vaporizable liquid will be converted to gas at a lower temperature. Thus, for example, the operating temperature of the heat pipe can be changed from temperatures below 0° C. to temperatures in excess of 100° C. With water as the heat pipe liquid operating temperatures can be changed over a range from 10° to 200° C. but will normally be from 10° to 105° C. Gas velocities may be very high, e.g., 50 to 300 feet per second, and turbine speeds may be as high as 1,000 r.p.m., e.g., 60 to 600 r.p.m. The generator may produce A.C. at voltages up to 440 or higher, if desired, or corresponding D.C.

The various materials of construction will be those normally employed for heat pipes, including glass, tempered glass, wire-reinforced glass, polymethyl methacrylate, ABS, fiberglass-reinforced polyester and other synthetic organic polymeric materials, including the well known engineering plastics, conductive metals, such as silver, aluminum, stainless steel and copper for heat transmissive parts and stainless steel for turbine blades, other turbine parts, baffles and internal pipes and supports. However, other metals and wood may also be employed. The wicking or fibrous material is preferably asbestos, glass fiber, cotton, wool, polyester or a suitable polyester-cotton blend but polyurethane foams, cellulosic foams, polyester foams, perforated plastics, etc., may also be used, providing that mass transfer and heat transfer through them takes place satisfactorily. With respect to materials of construction and others employed in operation of the present apparatus reference is made to my parent application Ser. No. 693,195, which is incorporated herein by reference.

Figure 3:
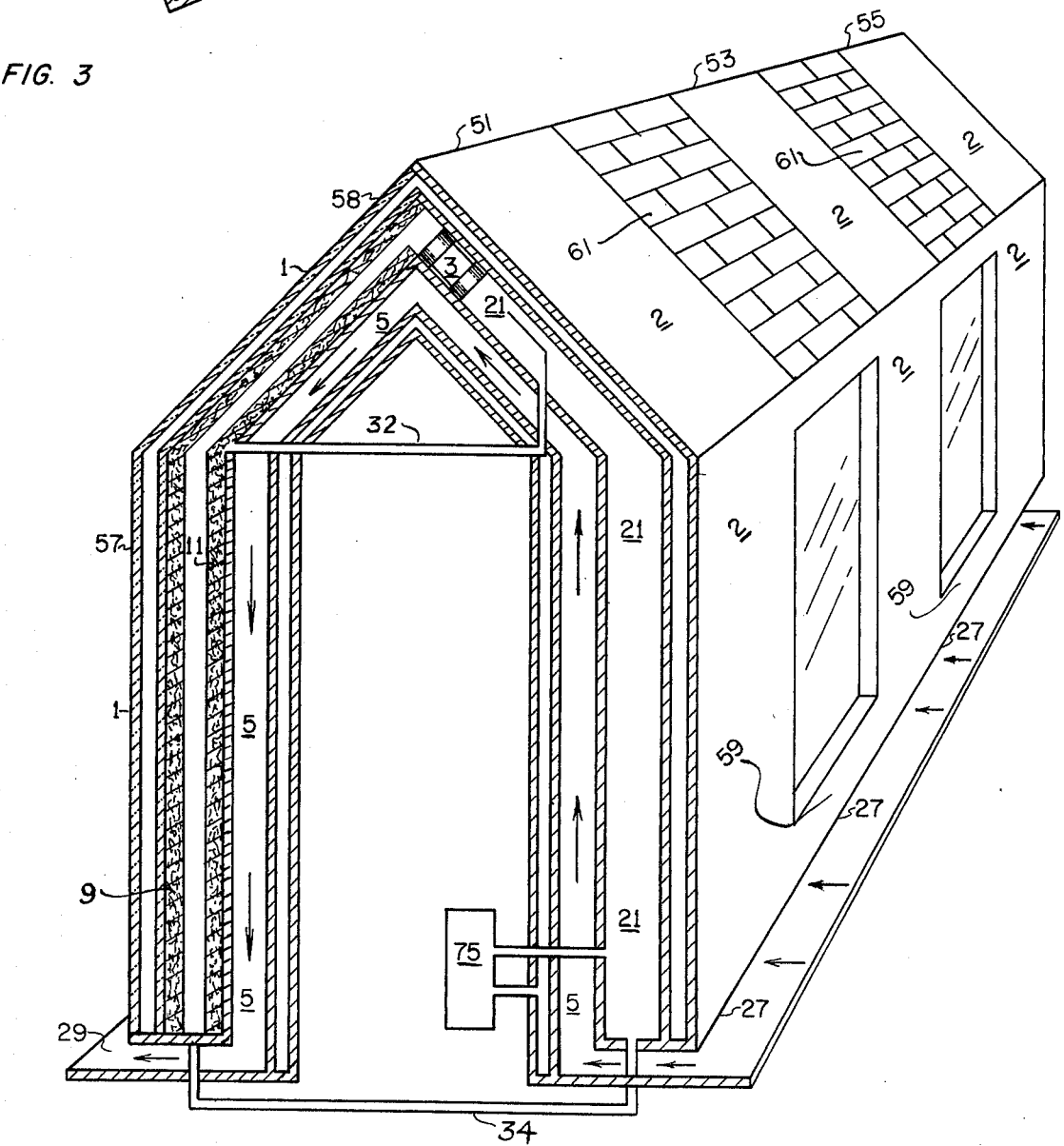
FIG. 3 is a partially cutaway and sectioned perspective view, in elevation, of a building containing a plurality of structurally supporting solar heat pipe feedback turbogenerator apparatuses of this invention.

Means for adjusting the pressure or vacuum in the heat pipe body and in the vacuum insulation chambers, such as chamber 8 of FIG. 1, are not specifically illustrated in that figure but it is understood that means such as a compressor or vacuum pump (or both) like that in FIG. 3 may also be employed with appropriate valving so that different vacuums or pressures, e.g., 20 to 600 mm. Hg absolute pressure or 0.2 to 10 atmospheres gauge, may be present in the heat pipe. The heat pipe conditions may be automatically adjusted in response to thermostatic controls too, for most efficient heat pipe operation, e.g., when the air temperature is lower the heat pipe operating temperature. The vacuum of the vacuum insulation may also be varied. Of course, in addition to vacuum insulation other insulating means, e.g., rock wool, polyurethane foam, gypsum board, dry air and equivalents may be employed and in some cases it may be desirable to substitute such means entirely for the vacuum chambers. Also, baffling means may be present in the raceways of the evaporating chamber of the heat pipe and in the condensing portion to promote more efficient evaporation and condensation, but such are not required.

In FIG. 1 it is intended to be indicated that the heat pipe and the insulating portions are closed at top, bottom and ends, in addition to the two panel sides, although for purposes of illustration one end has been cut through to show the interior of the heat pipe.

The panels of FIG. 1 may be employed as walls or roofs of buildings, in which case they are made strong enough to act as structural units of such buildings, in addition to being means for generating electricity. In such applications the cooling-heating fluid, usually air, may be utilized directly or indirectly to heat the building as by having a portion of it sent into the building before or after it has given up some of its heat (extracted from the condensing gas) to the vaporizable liquid in the evaporating section. Incidentally, in those instances when the cooling-heating air is not warmed to a high enough temperature to be able to heat condensate, which may be at substantially the same temperature, at least when it is circulated through passage 5 it prevents heat loss from the condensate.

FIG. 3 illustrates apparatuses of this invention in modified form employed as structural units of a building and to produce electricity therein. As shown, the building, located in the nothern hemisphere, has a wall and roof portion thereof, with evaporating sections in them, facing toward the south, the major direction from which solar heat comes, and has the condensing portions of the apparatus in a roof and wall facing toward the north. Thus, as illustrated, three units are employed, with the heat pipe apparatus evaporating section being on the sunny side of the building, a house, and with the condensing sections being on the shady side. The turbogenerator is shown near the top of the heat pipe on the shady side of the roof, but could also be on the other side or exactly at the top. Each of the three solar heat pipe feedback turbogenerators 51, 53 and 55 is of the structure illustrated in section with respect to unit 51 and each is of sufficient strength to be a supporting member and acts as a supporting part of the structural framework of the building that is served by the solar devices, being a structural part of both the roof and the side of the house. Thus, the evaporators of all three units are parts of south-facing wall 57 and of south-facing roof 58 of the structure and the three condensers too are integrated into the north-facing wall 59 and the north-facing roof portion 61. The gas, usually steam, after it has passed through the generator, is emptied into condenser 21, wherein it is condensed to a liquid and flows through line 32 back to wicks 11 and 9 (although shown as separate wicks, wicks 11 and 9 may be part of a circular wicking member so that when condensate is returned to wick 11 through line 32 it is also returned to the top portion of wick 9, which faces the source of radiation and absorbs heat from it). The cooling-heating air employed to condense the gas passing into the condensing section of the heat pipe enters passageway 5 at 27, near the bottom thereof, extracts heat from condensate falling through chamber 21 and which did not pass through line 32 and employs this heat to heat water or other vaporizable liquid in wick 11 (or wicks 11 and 9), which liquid is subsequently further heated by radiant heat so that it is converted into gas. The cooling-heating air exits at venting opening 29. The insulating vacuum casing about the unit prevents heat from the moving cooling-heating air in passageway 5 from heating the interior of the building unless conventional thermostatic controls, not illustrated herein for the sake of simplicity, cause the release of such air, either before or after it has been employed to pre-heat the vaporizable liquid in the wicking. The vacuum casing also helps to prevent loss of heat from the heat pipe other than by the designed heating mechanisms.

The condensate in chamber 21 may be allowed to seek its own level with respect to the evaporating section of the heat pipe and the wicking therein by means of connecting passageway 34 but such passageway may also have a pump, not shown, connected with it so as to assist in delivery of the condensate to the evaporating section and the outlet into such evaporating section from pipe 34 may be elevated, if desired, or the pump pressure may be such as to spray condensate into the evaporating chamber, thereby increasing the height at which it is delivered and diminishing the need for a wicking action to raise it. Means 75, schematically illustrated, includes a compressor and a vacuum pump and is provided with suitable valving and controls so as to allow the changing of the internal pressure in the vacuum insulating chamber and in the heat pipe (condensing chamber), sometimes automatically in response to ambient air temperature or other conditions. By control of the pressure in the heat pipe the operating temperature thereof is also controlled in known manner.

In addition to the use of heating-cooling air from heat pipe apparatus as a source of heat (or additional "insulation") for the building, by decreasing the vacuum (or increasing the absolute pressure) in the vacuum insulating chamber, especially that portion facing the residence interior, convective heat transfer may be encouraged and conductive transfer of heat from the interior of the less insulating chamber resulting may be utilized to heat the residence too, when desired.

In FIG. 4 is illustrated a huge solar heat pipe panel feedback turbogenerator apparatus, which in a preferred embodiment may be as much as 400 feet wide and a thousand feed long and may collect enough solar heat to be theoretically capable of producing about 40 megawatts in some areas, such as in high mountains or deserts wherein solar energy impact is as much as 90 watts/sq. ft. Solar reflectors 81, made of reflective, strong, tough synthetic organic polymeric plastic material, preferably reinforced with metal, glass, asbestos or other suitable fibers, are positioned so as to form a plurality of valleys, the axes of which are substantially parallel to the sun's path so that the valleys are always receiving sunlight and are reflecting it to the evaporating section 1 of the heat pipe turbogenerator apparatus. The heat pipe utilized is of essentially the same design as that of FIG. 1 (and FIG. 3) with condensing section 2 and turbogenerator 3 in similar positions. Reflectors 81 may be suitably held in position and may be movable, if desired, so that they may be placed in most advantageous position with respect to the sun's rays. In FIG. 4 tubular balloons 82 made of tough polymeric reinforced plastic material, are employed to support the large reflectors 81, with guide wires 84 holding the balloons in place. Cooling-heating air is pumped through cooling-heating passage 83 by pumping means, not shown, and is employed to pre-heat the vaporizable liquid in evaporator section 1, in the same general manner shown as is in FIG. 1.

It will be seen that the effective surface area of the condensing zone is much greater than that of the evaporating zone. Normally being from 2 to 100 times, preferably from 5 to 20 times as great. Using such greater proportions of condensing surface area promotes efficient operation of the apparatus because the temperature differential or driving force for condensation is usually less than that for evaporation. This also applied to the other heat pipe apparatuses previously described.

In FIG. 5 there is shown vertical reflector 91, which may be made of the same material as reflectors 81 but which is flexible enough so that it can be rolled up on or let out from a rotatable drum 93 and lowered or raised accordingly by a lighter-than-air balloon 97, held in place by tie lines 95. One such vertical reflector 91 is used to block the western end of the valley of reflectors 81 of FIG. 4 and to reflect light back onto them in the morning, when the sun is in the east. A second such reflector at the east end of the east-west reflective valley is raised at about noon or shortly thereafter to reflect the afternoon sun back onto reflectors 81. At about noontime both reflectors 91 may be raised and in the afternoon the western vertical reflector may be dropped, as the sun drops, to avoid blocking its rays from the evaporating portion of the heat pipe assembly. Instead of balloons other elevating means may be employed.

In FIG. 6 a side view of the heat pipe feedback turbogenerator air passageway 5 of the large apparatus of FIG. 4 is shown. Cool air is blown into the air passageway 5 at entrance 27 and passes close to the pincushioned surface 101 of condenser 2 because the passageway is kept small, sometimes being only one to ten inches wide or other such width so as to maintain a turbulent flow of the cooling fluid (air) next to such pincushioned surface. At the evaporator 1 area however, the air passageway slopes down appreciably, sometimes to an opening as great as 6 or 8 feet in width, with the air exit 29 at its lowest point. This helps to trap warm air up against the pincushioned surface 103 under the evaporator 1 while the cooler air is allowed to flow out at the bottom through passageway 29.

The invention has been described with respect to various embodiments and variations thereof but it will be evident that equivalents and substitutes may be employed without departing from it. Thus, different arrangements and locations of the evaporating and condensing sections of the heat pipe apparatus with a turbine between them may be employed, as on office buildings, towers, storage tanks and in some cases on mobile devices, such as trucks, trains, airplanes and automobiles. Thicknesses of various parts may be changed so as to withstand the pressures to which the particular parts are subjected and to promote better heat transfer through them. Different wicking materials may be utilized and in some cases lighter colored wicks may also be employed but it is highly preferred to utilize the blackest matte surface wicks possible so as to obtain highest absorption of solar heat, in some cases an absorption factor of 0.97 being achieved. All such and many other variations of the invention, whether or not specifically mentioned herein, are considered to be within the scope of it.

What is claimed is:

1. A solar heat pipe electric generator for converting radiant solar heat fo electric power which comprises a heat pipe having a vaporizable liquid therein and including a walled evaporating section and a condensing section, with a wall of the evaporating section being transmissive of radiant solar energy and being positioned so that such solar energy is directed onto it, a wicking material adjacent such wall and within the heat pipe for sorbing solar heat, with connecting means between the evaporating and condensing sections, through one of which the vaporizable liquid, on heating by the solar heat, passes as a gas from the evaporating section to the condensing section and through another of which condensed liquid from said gas passes from the condensing section to the evaporating section, with means in such first connecting section for converting the energy of the moving gas to electricity, said condensing section having with it means for cooling gas therein to condense it.

2. A solar heat pipe electric generator according to claim 1 wherein the radiant energy transmissive wall of the evaporating section is transparent and the adjacent wicking is dark colored.

3. A solar heat pipe electric generator for converting radiant solar heat to electric power which comprises a heat pipe having a vaporizable liquid therein and including evaporating and condensing sections, between which sections gas from the vaporizable liquid passes from the evaporating section to the condensing section and condensed liquid from said gas passes from the condensing section to the evaporating section, and means for converting the energy of the moving gas to electricity, said evaporating section of the heat pipe being walled, with a wall thereof being transmissive of radiant heat and being positioned so that radiant heat is directed onto it, which wall has adjacent to it within the heat pipe black wicking for sorbing radiant heat and which heat pipe includes wicking material adjacent another wall thereof onto which such radiant heat is not directed when it is directed onto such black wicking, and said condensing section having with it means for cooling gas therein to condense it.

4. A solar heat pipe electric generator according to claim 3 wherein the means for converting the energy of the moving gas to electricity is a turbogenerator between the evaporating and condensing sections of the heat pipe which has turbine and generator parts and separating means are located between the evaporating and condensing sections of the heat pipe and direct gas from the evaporating section through the turbine part of the turbogenerator to the condensing section and direct condensate from the condensing section back to the evaporating section.

5. A solar heat pipe turbogenerator according to claim 4 wherein the heat pipe is substantially flat and has the condensing section thereof above the evaporating section, the means for separating the condensing and evaporating sections thereof is shaped so as to direct the gas to a central portion of the heat pipe and from there to the turbine of the turbogenerator and such separating means includes openings at lower outer portions thereof through which condensate is returned to the evaporating section of the heat pipe.

6. A solar heat pipe turbogenerator according to claim 5 wherein the openings at the lower outer portions of the means separating evaporating and condensing sections of the heat pipe connect with perforated tubes which penetrate the wicking materials adjacent the heat pipe walls in the evaporating section so as to allow the passage of the condensate from the condensing section to interiors of the wicking materials.

7. A solar heat pipe turbogenerator according to claim 6 which includes a cooling and heating passage adjacent the wall onto which radiant heat is not being directed, which passage is adapted to pass cooling fluid to cool the condensing section of the heat pipe by absorbing heat from it, and to heat liquid in the evaporating section of the heat pipe.

8. A solar heat pipe turbogenerator according to claim 7 having means on the cooling-heating fluid passage walls for increasing conductivity from the cooling-heating fluid to said walls and for increasing the turbulence of flow of such fluid.

9. A solar heat pipe turbogenerator according to claim 8 wherein the heat pipe is enclosed in an insulating shield, the wall of which adjacent the evaporating section and facing the source of radiant heat is transparent and the wall of which adjacent the condensing section and facing the source of radiant heat is reflective or opaque to such radiant heat.

10. A solar heat pipe turbogenerator according to claim 9 having associated with it means for regulating the internal pressure of the heat pipe.

11. A solar heat pipe turbogenerator according to claim 10 having associated with it means for removing heated cooling-heating fluid after it has been employed to cool and condense the gas from the vaporizable heat pipe liquid and without using it to heat the liquid in the evaporating section of the heat pipe.

12. A solar heat pipe turbogenerator according to claim 11 wherein the insulating means about the heat pipe are glass or synthetic organic polymeric plastic material enclosures under a regulatable vacuum.

13. A solar heat pipe turbogenerator according to claim 2 wherein the cooling-heating fluid is air and which includes fan means for impelling the air downwardly through the cooling-heating fluid passage.

14. A heat pipe electric generator according to claim 1 wherein the means for cooling the gas in the condensing section of the heat pipe includes a passage for a cooling fluid adjacent to the condensing section, which passage also passes adjacent to the evaporating section so that heated cooling gas therein, after cooling the gas in the condenser section, conductively transfers heat from the heated cooling gas to the vaporizable liquid in the evaporating section of the heat pipe.

15. A heat pipe electric generator according to claim 1, in generally flat vertical shape with a wall thereof facing toward the sun and with evaporating and condensing heat pipe sections behind said wall in a direction away from the sun, said wall at the evaporating section being transparent to the radiant solar heat and at the condensing section being opaque or reflective to such heat or being covered by opaque or reflective material.

16. A heat pipe electric generator according to claim 1 having associated with it means for regulating the internal pressure of the heat pipe.

17. A heat pipe electric generator according to claim 1 having associated with it means for removing heated cooling-heating fluid after it has been employed to cool and condense the gas from the vaporizable heat pipe liquid in the condensing section of the heat pipe without heating the liquid in the evaporating section.

18. A heat pipe electric generator according to claim 1, at least part of which is in panel form, installed in a building wall and/or roof, generating electricity and being so incorporated therein as to be a structural member thereof.

19. A heat pipe electric generator according to claim 18 wherein the heat pipe evaporating section is in a wall and roof portion on a sunny side of the building, the condensing section of the heat pipe is in a roof and wall portion on a shady side of the building and the means for generating electricity is a turbogenerator substantially between such sections.

20. A heat pipe turbogenerator according to claim 19 which includes means for returning condensed vaporizable heat pipe liquid from the bottom of the condensing section to the evaporating section of the heat pipe.

21. A heat pipe electric generator according to claim 19 which includes means for adjusting the pressure in the heat pipe.

22. A heat pipe electric generator according to claim 19 which includes means for passing a cooling fluid past the condensing portion of the heat pipe to condense the vapor therein and then past the evaporating section of the heat pipe to heat liquid therein.

23. A heat pipe electric generator according to claim 19 wherein the heat pipe is covered by vacuum insulation and means are provided to control the vacuum thereof.

24. A heat pipe electric generator according to claim 1 comprising a plurality of reflectors for directing solar heat radiation onto the wicking in the evaporating section of the heat pipe for sorbing radiant solar heat and wherein the means for converting the energy of the moving gas to electricity is a turbogenerator located substantially between the evaporating and condensing sections of the heat pipe.

25. A solar heat pipe turbogenerator according to claim 24 wherein the reflectors are supported above the ground and are angularly positioned so as to have the sun strike at least some of them for most of the daylight hours and the condensing section is of an area which is at least ten times that of the evaporating section so as to facilitate ready condensation of the vaporizable heat pipe liquid.

26. A solar heat pipe turbogenerator according to claim 25 wherein the condensing section of the heat pipe is substantially flat and which includes means for passing a cooling fluid into contact with the condensing section to cool and condense to a liquid the gas produced in the evaporating section from the vaporizable liquid and includes means to return such condensed liquid to the evaporating section.

27. A solar heat pipe turbogenerator according to claim 26 wherein a passage is provided for communicating the cooling fluid for the condensing section of the heat pipe with the evaporating section so as to heat liquid in such evaporating section with heat in said cooling fluid previously extracted from the condensing gas, said means for having the fluid contact the evaporating section of the heat pipe being of greater depth nearer to an end of the evaporating section of the heat pipe away from the condensing section and having an opening at such end at the bottom thereof to facilitate removal of cooler cooling-heating fluid and to facilitate remaining of warmer cooling-heating fluid near the evaporating section of the heat pipe to promote transfer of heat from said fluid to the vaporizable liquid in the evaporating section.

28. A solar heat pipe turbogenerator according to claim 26 having associated with it supplemental reflector means capable of being raised and lowered to positions to reflect the sun's rays back to the other reflectors when raised and to allow passage of the sun's rays to said reflectors when lowered.

29. A method for producing electric power which comprises vaporizing vaporizable liquid in an evaporating section of a heat pipe containing a wicking material by means of radiant solar heat directed onto such wicking material and liquid through a transmissive wall of the evaporating section, passing the gas produced through a turbogenerator to generate electricity, said passage being to the condensing section of the heat pipe, condensing the gas to a liquid in the condensing section and returning said liquid to the evaporating section.

* * * * *